(12) United States Patent
Meek et al.

(10) Patent No.: US 9,396,269 B2
(45) Date of Patent: Jul. 19, 2016

(54) SEARCH ENGINE THAT IDENTIFIES AND USES SOCIAL NETWORKS IN COMMUNICATIONS, RETRIEVAL, AND ELECTRONIC COMMERCE

(75) Inventors: Christopher A. Meek, Kirkland, WA (US); Eric J. Horvitz, Kirkland, WA (US); Joshua T. Goodman, Redmond, WA (US); Gary W. Flake, Bellevue, WA (US); Oliver Hurst-Hiller, New York, NY (US); Anoop Gupta, Seattle, WA (US); Ramez Naam, Seattle, WA (US); Kenneth A. Moss, Mercer Island, WA (US); William H. Gates, III, Medina, WA (US); John C. Platt, Bellevue, WA (US); Trenholme J. Griffin, Bainbridge Island, WA (US); Bradly A. Brunell, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 669 days.

(21) Appl. No.: 11/427,288

(22) Filed: Jun. 28, 2006

(65) Prior Publication Data
US 2008/0005072 A1 Jan. 3, 2008

(51) Int. Cl.
G06F 17/30 (2006.01)
(52) U.S. Cl.
CPC .............................. *G06F 17/30867* (2013.01)
(58) Field of Classification Search
USPC .................. 707/706, 708, 732, 736, 999.001, 707/999.003, 999.1
See application file for complete search history.

(56) References Cited

U.S. PATENT DOCUMENTS

| 5,493,692 A | 2/1996 | Theimer et al. |
| 5,544,321 A | 8/1996 | Theimer et al. |
| 5,555,376 A | 9/1996 | Theimer et al. |

(Continued)

FOREIGN PATENT DOCUMENTS

| EP | 1288795 A1 | 3/2003 |
| WO | 9800787 | 1/1998 |
| WO | WO2006036216 | 4/2006 |

OTHER PUBLICATIONS

Andy Harter, et al., A Distributed Location System for the Active Office, IEEE Network, 1994, pp. 62-70.

(Continued)

*Primary Examiner* — Syed Hasan
(74) *Attorney, Agent, or Firm* — Steve Wight; Sandy Swain; Micky Minhas

(57) ABSTRACT

Architecture that monitors interaction data (e.g., search queries, query results and click-through rates), and provides users with links to other users that fall into similar categories with respect to the foregoing monitored activities (e.g., providing links to individuals and groups that share common interests and/or profiles). A search engine can be interactively coupled with one or more social networks, and that maps individuals and/or groups within respective social networks to subsets of categories associated with searches. A database stores mapped information which can be continuously updated and reorganized as links within the system mapping become stronger or weaker. The architecture can comprise a social network system that includes a database for mapping search-related information to an entity of a social network, and a search component for processing a search query for search results and returning a link to an entity of a social network based on the search query.

20 Claims, 16 Drawing Sheets

(56) References Cited

U.S. PATENT DOCUMENTS

| | | |
|---|---|---|
| 5,603,054 A | 2/1997 | Theimer et al. |
| 5,611,050 A | 3/1997 | Theimer et al. |
| 5,812,865 A | 9/1998 | Theimer et al. |
| 6,353,398 B1 | 3/2002 | Amin et al. |
| 6,466,232 B1 | 10/2002 | Newell et al. |
| 6,513,046 B1 | 1/2003 | Abbott, III et al. |
| 6,549,915 B2 | 4/2003 | Abbott, III et al. |
| 6,672,506 B2 | 1/2004 | Swartz et al. |
| 6,691,106 B1 | 2/2004 | Sathyanarayan |
| 6,741,188 B1 | 5/2004 | Miller et al. |
| 6,745,178 B1 | 6/2004 | Emens et al. |
| 6,747,675 B1 | 6/2004 | Abbott et al. |
| D494,584 S | 8/2004 | Schlieffers et al. |
| 6,791,580 B1 | 9/2004 | Abbott et al. |
| 6,796,505 B2 | 9/2004 | Pellaumail et al. |
| 6,801,223 B1 | 10/2004 | Abbott et al. |
| 6,812,937 B1 | 11/2004 | Abbott et al. |
| 6,837,436 B2 | 1/2005 | Swartz et al. |
| 6,842,877 B2 | 1/2005 | Robarts et al. |
| 6,934,684 B2 | 8/2005 | Alpdemir et al. |
| 6,935,566 B1 | 8/2005 | Mulla et al. |
| 6,965,868 B1 | 11/2005 | Bednarek |
| 6,968,333 B2 | 11/2005 | Abbott et al. |
| 7,010,501 B1 | 3/2006 | Roslak et al. |
| 7,040,541 B2 | 5/2006 | Swartz et al. |
| 7,063,263 B2 | 6/2006 | Swartz et al. |
| 7,103,470 B2 | 9/2006 | Mintz |
| 7,171,378 B2 | 1/2007 | Petrovich et al. |
| 7,195,157 B2 | 3/2007 | Swartz et al. |
| 7,385,501 B2 | 6/2008 | Miller et al. |
| 7,409,384 B2 * | 8/2008 | Szeto et al. ............... 707/3 |
| 7,480,712 B2 * | 1/2009 | Moy .......................... 709/223 |
| 7,516,010 B1 | 4/2009 | Kaplan et al. |
| 7,525,450 B2 | 4/2009 | Miller et al. |
| 7,529,639 B2 | 5/2009 | Rasanen et al. |
| 7,693,752 B2 | 4/2010 | Jaramillo |
| 7,702,536 B1 | 4/2010 | Alabraba et al. |
| 2001/0030664 A1 | 10/2001 | Shulman et al. |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2002/0032689 A1 | 3/2002 | Abbott, III et al. |
| 2002/0035474 A1 | 3/2002 | Alpdemir |
| 2002/0044152 A1 | 4/2002 | Abbott, III et al. |
| 2002/0049644 A1 | 4/2002 | Kargman |
| 2002/0049709 A1 | 4/2002 | Miyasaki et al. |
| 2002/0052930 A1 | 5/2002 | Abbott et al. |
| 2002/0052963 A1 | 5/2002 | Abbott et al. |
| 2002/0054130 A1 | 5/2002 | Abbott, III et al. |
| 2002/0054174 A1 | 5/2002 | Abbott et al. |
| 2002/0069117 A1 | 6/2002 | Carothers et al. |
| 2002/0078045 A1 | 6/2002 | Dutta |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0082930 A1 | 6/2002 | Park |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2002/0138479 A1 | 9/2002 | Bates et al. |
| 2002/0143560 A1 | 10/2002 | Hanson et al. |
| 2002/0150050 A1 | 10/2002 | Nathanson |
| 2002/0194081 A1 | 12/2002 | Perkowski |
| 2002/0198814 A1 | 12/2002 | Bansal et al. |
| 2003/0004802 A1 | 1/2003 | Callegari |
| 2003/0013438 A1 | 1/2003 | Darby |
| 2003/0014307 A1 | 1/2003 | Heng |
| 2003/0046401 A1 | 3/2003 | Abbott et al. |
| 2003/0069877 A1 | 4/2003 | Grefenstette et al. |
| 2003/0125958 A1 | 7/2003 | Alpdemir et al. |
| 2003/0126250 A1 | 7/2003 | Jhanji |
| 2003/0135499 A1 | 7/2003 | Schirmer et al. |
| 2003/0154476 A1 | 8/2003 | Abbott, III et al. |
| 2003/0158796 A1 | 8/2003 | Balent |
| 2003/0171941 A1 | 9/2003 | Kraenzel et al. |
| 2003/0216960 A1 | 11/2003 | Postrel |
| 2004/0006478 A1 | 1/2004 | Alpdemir et al. |
| 2004/0024846 A1 | 2/2004 | Randall et al. |
| 2004/0030490 A1 | 2/2004 | Hegedus et al. |
| 2004/0041836 A1 * | 3/2004 | Zaner et al. .................. 345/751 |
| 2004/0044658 A1 | 3/2004 | Crabtree et al. |
| 2004/0056905 A1 | 3/2004 | Lawrence |
| 2004/0148275 A1 | 7/2004 | Achlioptas |
| 2004/0198386 A1 | 10/2004 | Dupray |
| 2004/0201500 A1 | 10/2004 | Miller et al. |
| 2004/0225560 A1 | 11/2004 | Lewis et al. |
| 2004/0243580 A1 * | 12/2004 | Markki et al. .................... 707/9 |
| 2004/0249559 A1 | 12/2004 | Mintz |
| 2005/0004838 A1 | 1/2005 | Perkowski et al. |
| 2005/0034078 A1 | 2/2005 | Abbott et al. |
| 2005/0038856 A1 | 2/2005 | Krishnasamy et al. |
| 2005/0064959 A1 | 3/2005 | Ortiz |
| 2005/0065959 A1 | 3/2005 | Smith et al. |
| 2005/0075932 A1 | 4/2005 | Mankoff |
| 2005/0091202 A1 * | 4/2005 | Thomas ........................... 707/3 |
| 2005/0091205 A1 * | 4/2005 | Sidlosky et al. ................... 707/3 |
| 2005/0159970 A1 | 7/2005 | Buyukkokten et al. |
| 2005/0251440 A1 | 11/2005 | Bednarek |
| 2005/0257240 A1 | 11/2005 | Faulkner et al. |
| 2005/0266858 A1 | 12/2005 | Miller et al. |
| 2005/0267816 A1 | 12/2005 | Jaramillo |
| 2005/0272442 A1 | 12/2005 | Miller et al. |
| 2005/0273351 A1 * | 12/2005 | Chudnovsky et al. ............. 705/1 |
| 2005/0278443 A1 * | 12/2005 | Winner et al. ................. 709/224 |
| 2005/0289113 A1 * | 12/2005 | Bookstaff ......................... 707/1 |
| 2006/0004703 A1 | 1/2006 | Spivack et al. |
| 2006/0004713 A1 | 1/2006 | Korte et al. |
| 2006/0019676 A1 | 1/2006 | Miller et al. |
| 2006/0069699 A1 * | 3/2006 | Smadja et al. ............. 707/104.1 |
| 2006/0075034 A1 | 4/2006 | Lakkala et al. |
| 2006/0195790 A1 * | 8/2006 | Beaupre et al. ............... 715/727 |
| 2007/0005654 A1 * | 1/2007 | Schachar et al. .......... 707/104.1 |
| 2007/0061246 A1 | 3/2007 | Ramer et al. |
| 2007/0061302 A1 | 3/2007 | Ramer et al. |
| 2007/0100798 A1 * | 5/2007 | Kapur .............................. 707/3 |
| 2007/0136429 A1 * | 6/2007 | Fine et al. .................... 709/206 |
| 2007/0192229 A1 | 8/2007 | Rowan |
| 2007/0233672 A1 * | 10/2007 | Sanfacon et al. .................. 707/5 |
| 2007/0271235 A1 | 11/2007 | Frank et al. |
| 2008/0005074 A1 | 1/2008 | Flake et al. |
| 2008/0005104 A1 | 1/2008 | Flake et al. |
| 2008/0090591 A1 | 4/2008 | Miller et al. |
| 2008/0091537 A1 | 4/2008 | Miller et al. |
| 2008/0161018 A1 | 7/2008 | Miller et al. |
| 2009/0006413 A1 | 1/2009 | Andersen |
| 2010/0153832 A1 | 6/2010 | Markus et al. |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, in Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38-No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

(56) References Cited

OTHER PUBLICATIONS

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36-No. 7.

Roy Want, et al., The Active Badge Location System, ACM Transactions on Information Systems, Jan. 1992, pp. 91-102, vol. 10-No. 1.

Mark Weiser, Some Computer Science Issues in Ubiquitous Computing, Communications of the ACM, Jul. 1993, pp. 75-84, vol. 36-No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of the First International Conference on the Practical Application of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of the First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8-No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: a System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 pages.

Robert M. Losee, Jr., Minimizing information overload: the ranking of electronic messages, Journal of Information Science 15, Elsevier Science Publishers B.V., 1989, pp. 179-189.

OA mailed on Feb. 17, 2009, for U.S. Appl. No. 11/427,291, 23 pages.

Benzinger, "Eurekster Swickis: Community Powered Search", Oct. 19, 2005, pp. 1-pp. 5.

Keenoy,"Personalisation of Web Search", 2005, pp. 201-pp. 228.

Sli Systems, "Eurekster Launches Fitst Internet Search Engine Powered by Social Networks", Jan. 21, 2004, pp. 1-pp. 4.

Sullivan, "Eurekster Launches Personalized Social Search", Jan. 21, 2004, pp. 1-pp. 4.

Parameswaran, et al., "P2P Networking: An Information-Sharing Alternative", IEEE Computer Society Press, Computer, vol. 34, Issue 7, 2001, pp. 31-38.

Upadrashta, et al., "Social Networks in Peer-to-Peer Systems", In the Proceedings of the 38th Annual Hawaii International Conference on System Sciences, vol. 7, 2005, pp. 200c, pp. 1-9.

Office Action for U.S. Appl. No. 11/427,291, mailed on May 11, 2011, Christopher A. Meek, "Data Management in Social Networks," 27 pages.

Billinghurst et al., "An Evaluation of Wearable Information Spaces," Proceedings of the Virtual Reality Annual International Symposium, 1998, 8 pages.

Billinghurst et al., "Wearable Devices—New Ways to Manage Information," IEEE Computer Society, Jan. 1999, pp. 57-64.

Chen et al., "A Survey of Context-Aware Mobile Computing Research," Dartmouth Computer Science Technical Report, 2000, 16 pages.

Chen et al., "LORE: An infrastructure to support location-aware services," IBM Journal of Research and Development. 2004;48(5/6):601-15.

Christiansen, Electronic finance: Economics and institutional factors. Financial Market Trends. 2002; 81: 45-79.

Dragoi, "The continuum architecture: Towards enabling chaotic ubiquitous computing," Ph.D. Dissertation. University of Waterloo, Canada, 2005, 188 pages.

Gonzalo, "A Business Outlook regarding Electronic Agents," Intl J Law Info Technol. 2001; 9(3): pp. 189-203.

Harter et al., "A Distributed Location System for the Active Office," IEEE Network, 1994, pp. 62-70.

Henzinger et al., "Query-Free News Search," May 24, 2003, ACM, pp. 1-10.

Horvitz et al., "Attention-Sensitive Alerting in Computing Systems," Microsoft Research, Aug. 1999, 26 pages.

Horvitz et al., "In Pursuit of Effective Handsfree Decision Support: Coupling Bayesian Inference, Speech Understanding, and User Models," 1995, 8 pages.

Jayme, "The Monster Blog: Friends at Work," Jun. 16, 2005, <<http://replay.waybackmachine.org/20060329114258/http://monster.typepad.com/monsterblog/2005/06/friends_at_work.html>>, pp. 1-3.

Joachims, "Text Categorization with Support Vector Machines: Learning with Many Relevant Features," Machine Learning, European Conference on Machine Learning, Apr. 21, 1998, 6 pages.

Kurkovsky et al., "Using ubiquitous computing in interactive mobile marketing," Personal and Ubiquitous Computing, 2006, 10(4):227-40, 14 pages.

Li, "Enterprise goes mobile: A framework and methodology for creating a mobile enterprise," D. Mgt. Dissertation. Lawrence Technological Universtity, United State, Michigan, 2006, 206 pages.

Losee, "Minimizing information overload: the ranking of electronic messages," Journal of Information Science 15, Elsevier Science Publishers B.V., 1989, pp. 179-189.

Muller-Lankenau et al., "Strategic channel alignment: an analysis of the configuration of physical and virtual marketing channels," Information Systems and eBusiness Management,2006;4(2): pp. 187-216.

Office Action for U.S. Appl. No. 11/427,296, mailed on Apr. 1, 2011, Gary W. Flake, "Search Over Designated Content," 15 pages.

Non-Final Office Action for U.S. Appl. No. 11/427,287, mailed on May 9, 2012, Gary W. Flake et al., "Search Guided By Location and Context," 35 pages.

Final Office Action for U.S. Appl. No. 11/427,296, mailed Sep. 15, 2011, "Search Over Designated Content," 16 pages.

International Search Report dated Sep. 29, 2003 for PCT Application Serial No. 00/0685, 3 pages.

Rhodes et al., "Remembrance Agent: A continuously running automated information retrieval system," The Proceedings of the First International Conference on the Practical Application of Intelligent Agents and Multi-Agent Technology, 1996, 8 pages.

Schilit, "A System Architecture for Context-Aware Mobile Computing," Columbia University, 1995, 153 pages.

Schilit et al., "Context-Aware Computing Applications," In Proceedings of the Workshop on Mobile Computing Systems and Applications, Dec. 1994, 6 pages.

Schilit et al., "Customizing Mobile Applications," Proceedings USENIX Symposium on Mobile and Location Independent Computing, Aug. 1993, 9 pages.

Schilit et al., "Disseminating Active Map Information to Mobile Hosts," IEEE Network, 1994, vol. 8-No. 5, 23 pages.

Schilit et al., "The PARC TAB Mobile Computing System," IEEE WWOS-IV, 1993, 4 pages.

Secker,"Does m-commerce know where its going?" Telecommun Intl. 2001; 35(4): pp. 85-88.

Shugan, "The Impact of Advancing Technology on Marketing and Academic Research," Marketing Science. 2004, 23 (4), pp. 469-475.

(56) References Cited

OTHER PUBLICATIONS

Simon, "Sinking your teeth into m-commerce," Intell Enter., 2000, 3(13), pp. 60-63.
Spreitzer et al., "Architectural Considerations for Scalable, Secure, Mobile Computing with Location Information," In the 14th International Conference on Distributed Computing Systems, Jun. 1994, pp. 29-38.
Spreitzer et al., "Providing Location Information in a Ubiquitous Computing Environment," SIGOPPS '93, 1993, pp. 270-283.
Spreitzer, "Scalable, Secure, Mobile Computing with Location Information," Communications of the ACM, Jul. 1993, vol. 36-No. 7, 1 page.
Theimer et al., "Operating System Issues for PDAs," In Fourth Workshop on Workstation Operating Systems, 1993, 7 pages.
Want et al., "The Active Badge Location System," ACM Transactions on Information Systems, vol. 10-No. 1, Jan. 1992, pp. 91-102.
Wieland, "Where is the nearest LBS provider?" Telecommun Intl., 2001, 35(9), pp. 20-22.
Young, "Handicapping M-commerce," Wireless Rev., 2000; 17(15), pp. 24-30.
Final Office Action for U.S. Appl. No. 11/427,287, mailed on Jan. 4, 2013, Gary W. Flake et al., "Search Guided by Location and Context", 28 pages.
Office Action for U.S. Appl. No. 11/427,291, mailed on Dec. 23, 2011, Christopher A. Meek, "Data Management In Social Networks," 29 pages.
Office action for U.S. Appl. No. 11/427,291, mailed on Jun. 17, 2013, Meek et al., "Data Management in Social Networks", 17 pages.
Office action for U.S. Appl. No. 11/427,287, mailed on Jun. 21, 2013, Flake et al., "Search Guided by Location and Context", 31 pages.
Office action for U.S. Appl. No. 11/427,287, mailed on Dec. 4, 2013, Flake, et al., "Search Guided by Location and Context", 8 pages.
Office action for U.S. Appl. No. 11/427,291, mailed on Dec. 17, 2013, Meek, et al., "Data Management In Social Networks", 22 pages.
Office action for U.S. Appl. No. 11/427,291, mailed on Nov. 17, 2014, Meek et al., "Data Management In Social Networks", 22 pages.
Office action for U.S. Appl. No. 14/506,448, mailed on Aug. 28, 2015, Flake et al., "Search Guided by Location and Context ", 13 pages.

\* cited by examiner

SEARCH ENGINE THAT IDENTIFIES AND USES SOCIAL NETWORKS IN COMMUNICATIONS, RETRIEVAL, AND ELECTRONIC COMMERCE

CROSS REFERENCE TO RELATED APPLICATIONS

This application is related to U.S. Pat. No. 9,141,704 entitled "DATA MANAGEMENT IN SOCIAL NETWORKS" (Meek et al.), filed Jun. 28, 2006, the entirety of which is incorporated herein by reference.

BACKGROUND

The emergence of global communication networks such as the Internet and major cellular networks has precipitated interaction between users and other network entities. Not only are cellular and IP networks now a principal form of communications, but also a central means for interacting with other users for most purposes. Network users now have mechanisms for searching and communicating (or socializing) on virtually any topic of interest. However, this vast resource of information can also be an impediment to finding information as it continues to grow with no end in sight. This presents a formidable challenge when trying to find the information desired or other users who have similar points of interest.

One such network entity that provides social interaction around common subjects is the social network. Social network theory focuses on the relationships and links between individuals or groups of individuals within the network, rather than the attributes of individuals or entities. Smaller, stronger networks can be less useful to network individuals than networks with many weak links to individuals outside the main network. Generally, a social network can be described as a structure of nodes that represent individuals or groups of individuals (e.g., organizations). Social networking can also refer to a category of network applications that facilitate connecting friends, business partners, or other entities or groups of entities together.

Social networks with many weak links and social connections are more likely to provide new ideas and opportunities to the network individuals or groups than relatively closed networks that can have many redundant links such as in a group of individuals who routinely interact, and may already share the same knowledge and opportunities. Accordingly, individuals or groups of individuals of the social network having connections to other social entities are more likely to have access to a wider range of different information. Thus, social networks can function as a source of information that is more relevant to what a user may want.

However, given the already vast amount of information available and increasing number of new data sources coming online and the differing types of data being provided, finding these more focused and relevant resources of information such as social networks can be difficult.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Disclosed is architecture that monitors interaction data (e.g., search queries, query results and click-through rates), and provides users with links to other users that fall into similar categories with respect to the foregoing monitored activities (e.g., providing links to individuals and groups that share common interests and/or profiles such as in a social network).

In one implementation, a search engine of the architecture can be interactively coupled with one or more social networks, and that maps individuals and/or groups within respective social networks to subsets of categories associated with searches. A database can be employed to store the mapped information which can be continuously updated and reorganized as links within the system mapping become stronger or weaker.

Another alternative implementation includes the search engine being built into instant messaging or other social applications so that background searches can be executed in connection with interaction between individuals.

Accordingly, the invention disclosed and claimed herein, in one aspect thereof, comprises a computer-implemented system that facilitates social networks. The system includes a database that maps search related information to an entity of a social network, and a search component that processes a search query for search results and returns a link to an entity of a social network based on the search query.

In yet another aspect thereof, a machine learning and reasoning component is provided that employs a probabilistic and/or statistical-based analysis to prognose or infer an action that a user desires to be automatically performed.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
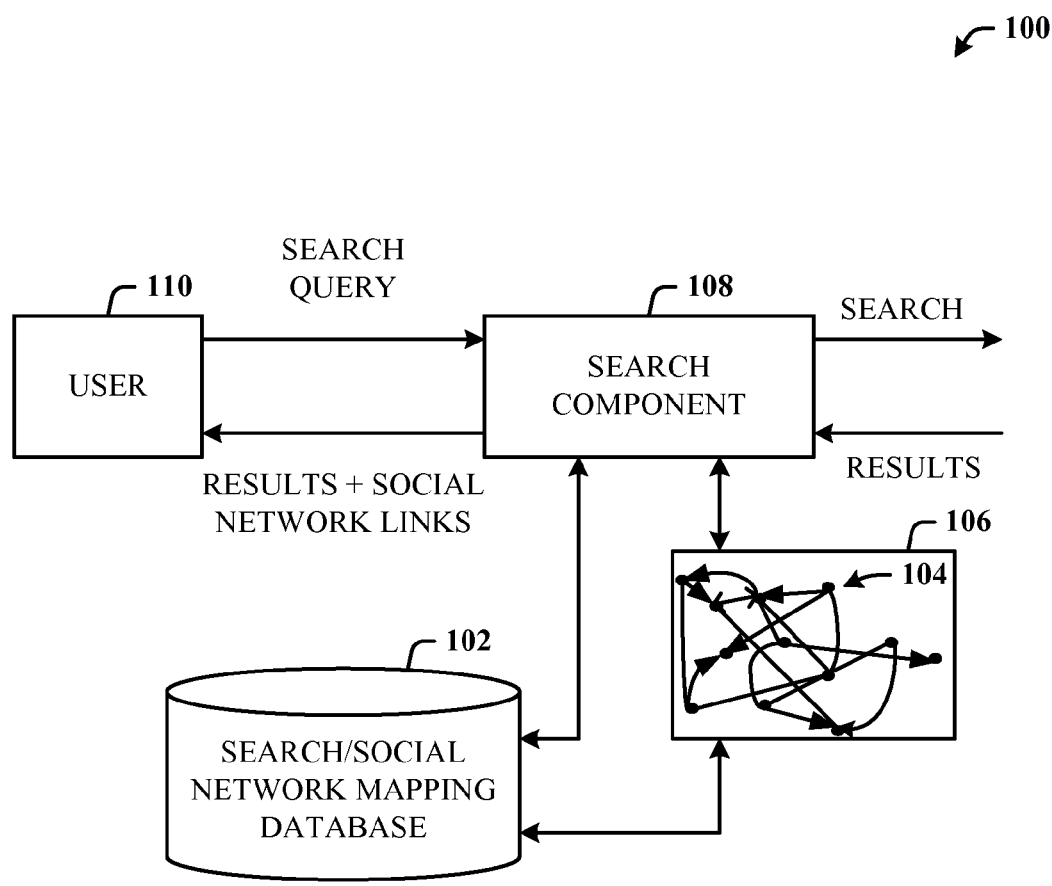
FIG. 1 illustrates a computer-implemented system that facilitates social networking between entities in accordance with an innovative aspect.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The disclosed innovation monitors interaction data (e.g., search queries, query results and click-through rates), and provides users with links to other users that fall into similar categories with respect to the foregoing monitored activities (e.g., providing links to individuals and groups that share common interests and/or profiles). For example, as part of delivered search results a search engine can provide links to individuals or groups of individuals that share common interests and/or profiles.

Referring initially to the drawings, FIG. 1 illustrates a computer-implemented system 100 that facilitates social networks in accordance with an innovative aspect. The system 100 includes a database 102 that stores mapping information that maps user interaction information (e.g., search-related information) to an entity 104 of a social network 106. The mapping information can be continuously updated and reorganized as links within the system mapping become stronger or weaker. A search component 108 (which can include a search engine) processes a search query of a user 110 for search results and returns a link to the user 110 that references the entity 104 of the social network 106 based on the mapping information. The search component 108 (e.g., the search engine) can be interactively coupled with one or more social networks and map individuals and/or groups within respective social networks to subsets of categories associated with searches.

Figure 2:
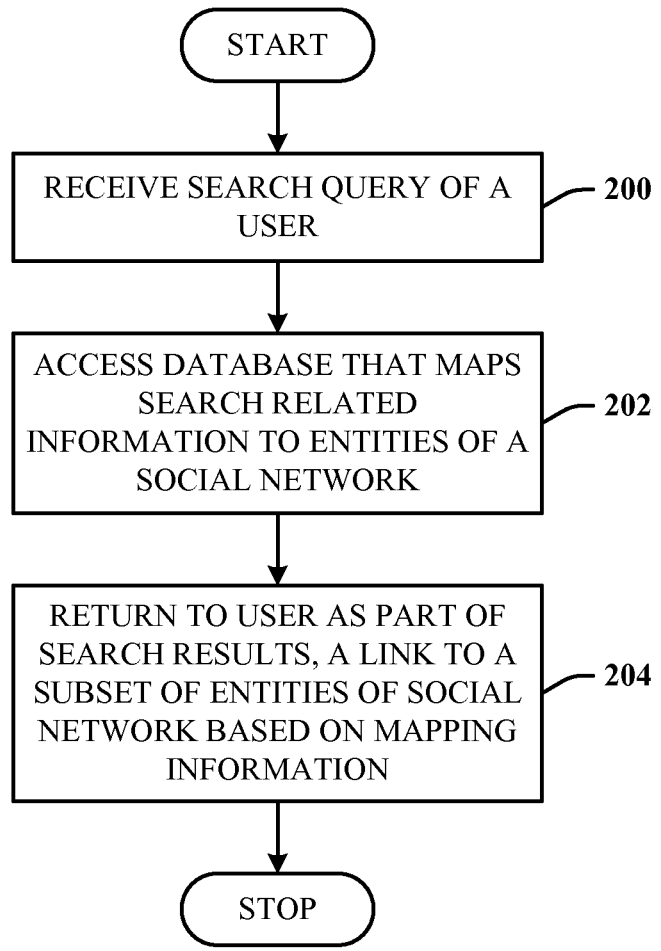
FIG. 2 illustrates a methodology of social networking in accordance with an aspect.

FIG. 2 illustrates a methodology of entity social networking in accordance with an aspect. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a search query of a user is received for processing. At 202, a database that provides mappings between search-related information and entities of a social network, is accessed. At 204, a link is returned to the user as part of the search results. The link is to a subset of entities (e.g., individuals or groups of individuals) of the social network based on the mapping information.

Figure 3:
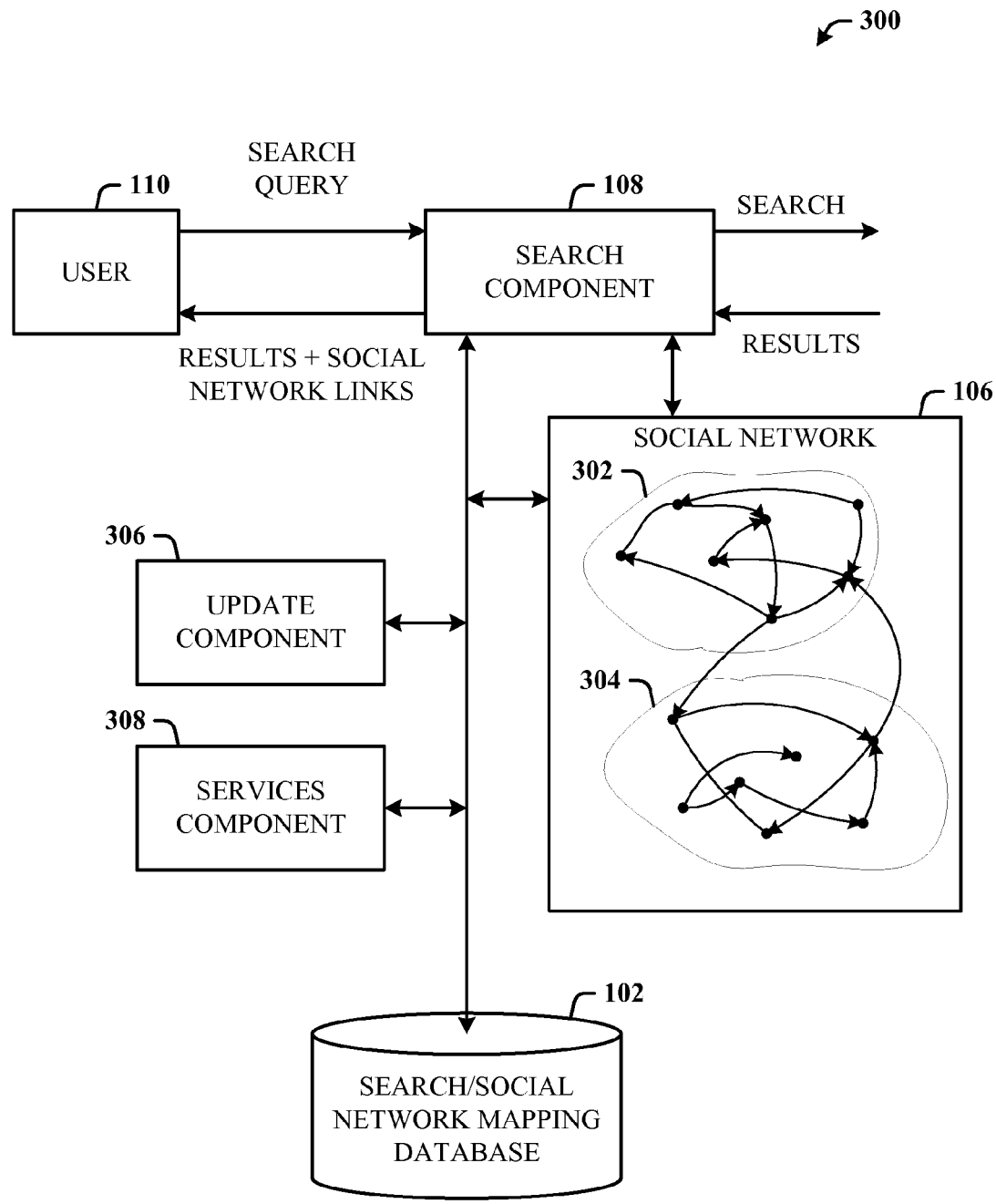
FIG. 3 illustrates an alternative computer-implemented system that facilitates social networks in accordance with a novel aspect.

FIG. 3 illustrates an alternative computer-implemented system 300 that facilitates social networks in accordance with a novel aspect. The system 300 includes the database 102 for storing mapping information that maps user interaction information to the entity 104 of the social network 106. The search component 108 (which can include a search engine) processes the search query of the user 110 for search results and returns a link to a node of the social network 106 based on the mapping information. As illustrated in greater detail, the social network 106 can include many nodes, herein also referred to as individuals or users that share a common topic of interest. In other words, the network 106 includes a first social subnetwork 302 (or group) of individuals (circumscribed by a dotted line). The social network 106 can include multiple social networks of individuals who communicate and interact on different topics of interest. Accordingly, the social network 106 can include a second social subnetwork 304 (or group) of individuals (circumscribed by a dotted line).

FIG. 3 also illustrates that the subnetworks (302 and 304) (or groups) can interact. Thus, mapping information can be stored in the database 102 that maps not only individuals to individuals of one social network, but also one social subnetwork (or group) to another subnetwork (group). Moreover, an individual of the first subnetwork 302 can be linked to the second subnetwork 304, in that only a single individual of the first social subnetwork 302 may share a strong link in the common topic of interest with the second social subnetwork 304. Here, two individuals (or nodes) are shown as linking between the first and second social networks (302 and 304). Note that although the social network 106 illustrates two subnetworks, it is to be understood that it can represent any number of social networks.

The structure and makeup of the subnetworks (302 and 304) can change dynamically as individuals enter and leave the subnetworks based on searches, search results, and other interaction data, for example, and as topics of interest change. Accordingly, the mappings stored in the database 102 can change. An update component 306 is provided to process such changes, and thereafter facilitate updating the mapping information in the database 102.

A services component 308 provides services which can be employed based on a threshold of interest among individuals or groups of individuals being exceeded. For example, if a majority of the individuals of the social network 106 interact in such a way as to meet or exceed the threshold, a new social subnetwork can be formed based on a new topic of interest, and the services component 308 will operate to initiate one or more services that facilitate further interaction associated with that new topic of interest and the new social subnetwork. For example, if the social subnetwork is associated with a parental-related topic of interest, the triggered service or event can be associated with a party, book club, piano recital, play group, baby sitting service, car pool, new bus route, sales discussion, and so on. The services or events that can be triggered for inclusion are numerous.

In the context of searching, the user 110 enters a search query and results of the search are returned. The results can be ranked or prioritized in any way desired by the user or system. In accordance with a novel aspect, a link (or other type of reference information) can also be returned as part of the search results that leads the user 110 to other users who share the common interest, which can be inferred by the search terms or phrases. Thus, if the results are not exactly what the user desires, the link can provide another source from which the user can obtain the desired information.

Figure 4:
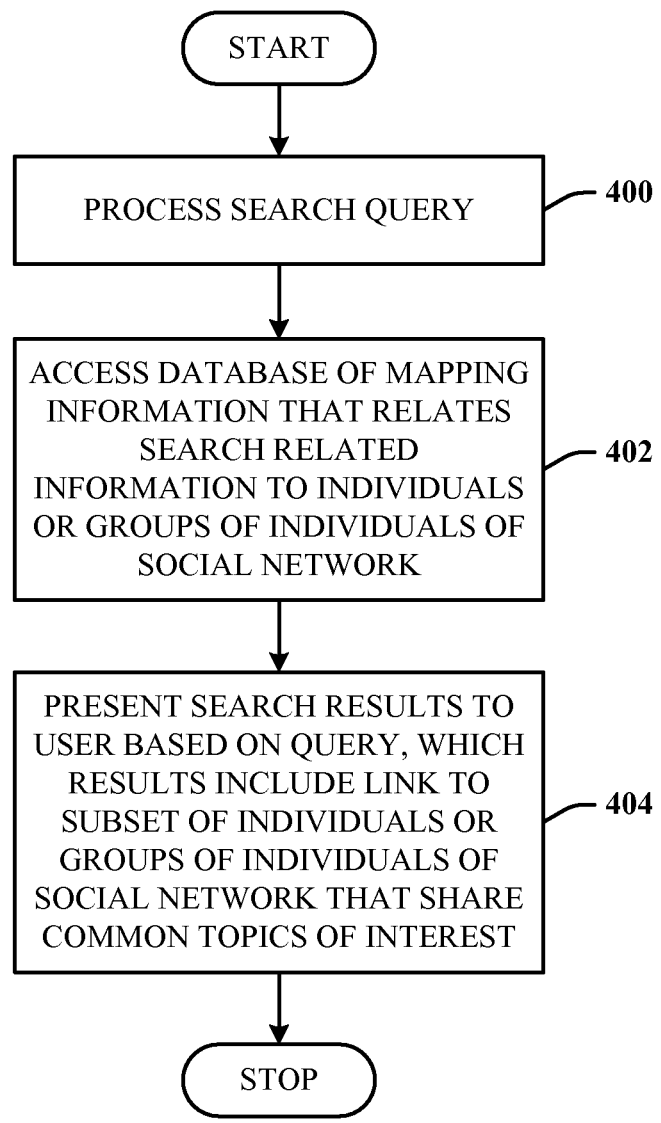
FIG. 4 illustrates a methodology of social networking related to a search query in accordance with another aspect of the innovation.

FIG. 4 illustrates a methodology of social networking related to a search query in accordance with another aspect of the innovation. At 400, a search query is received and processed. At 402, a database of mapping information is accessed that associates search-related information with individuals or groups of individuals of a social network. At 404, search results are presented to the user based on the query, which results include at least one link (or other reference information) to a subset of individuals or groups of individuals of a social network that share at least one common topic of interest.

Figure 5:
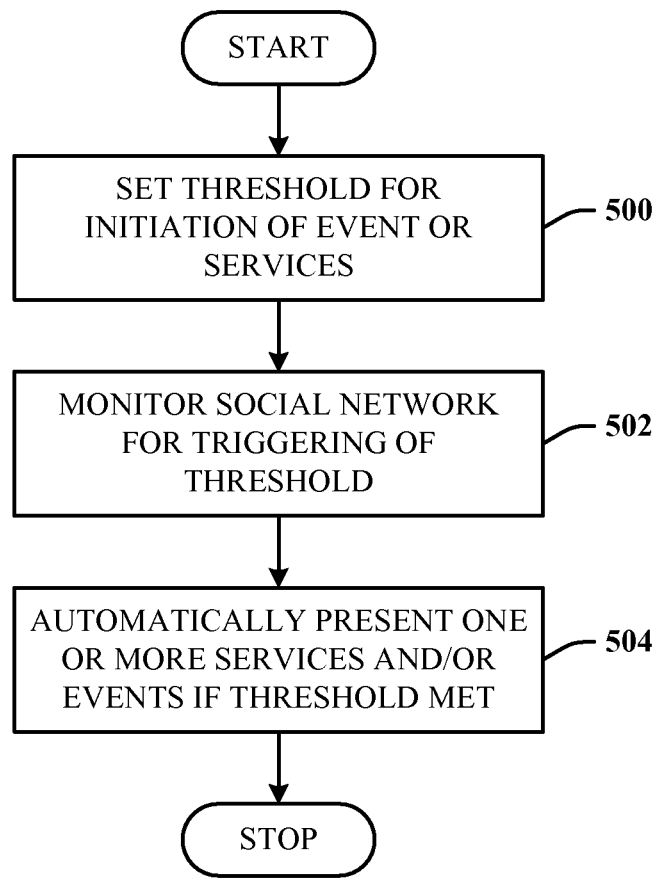
FIG. 5 illustrates a methodology of threshold processing for a social network in accordance with an aspect.

FIG. 5 illustrates a methodology of threshold processing for a social network in accordance with an aspect. At 500, a threshold is set for initiation of a service or event. At 502, the social network is monitored for triggering of the services or event based on the threshold. At 504, if the threshold is met, one or more of the services and/or events are automatically presented to or initiated for individuals of the network.

In one implementation, the topic of interest can be work-in-progress (WIP) that automatically causes users associated with the work project to be networked together, and further, to be directed to other sources of information based on searching for work-related information. Carrying this example further, as the project grows, users will be assigned to groups to oversee or be involved with certain aspects of the project. Thus, common topics of interest can change among the users, thereby causing the creation of new social networks based on these changing topics.

Additionally, as the network changes, initiation of services can be triggered. In one services example, as the network grows larger, a service can be invoked that moves the network into a collaboration application environment. In another example, if the shared topic of interest is determined to be associated with sensitive information, the service will automatically, or at least prompt one or more users to move into a more secure communications environment.

This capability can be employed by weighting variables or other aspects associated with the information or user interactions being processed. For example, the type of user interaction can be a determining factor in how a social network is developed, as well as what links will be returned along with the search results. Continuing with the WIP example, certain topics or aspects of the project can be predetermined to be more important than other topics. This weighting can be associated with higher level individuals such as project managers, for example. That is, if the project manager initiates a search for a certain topic related to the WIP, one or more links can be returned as part of the search results that point the project manager to other social networks of employees involved with the WIP that may be ongoing or are known to be actively involved with this topic.

The weighting value can also be adjusted by the number of edges to a network node. For example, if the number of links to a node or individual of the network is greater relative to another network node, the value of user interaction for that node can be higher.

Moreover, where advertisements are involved, the value of advertisements presented or processed through the node with the higher number of edges or links leading into or out of that node can be valuated higher than for other nodes.

The weighting could also change according to progress involved with the WIP. For example, as the WIP moves forward, certain milestones must be met or at least addressed. These milestones can be topics of interest having associated therewith corresponding weightings that change temporally (e.g., increase as the date for meeting the milestones approaches). Thus, the associated topics become increasingly important as the date of the milestone draws near.

Figure 6:
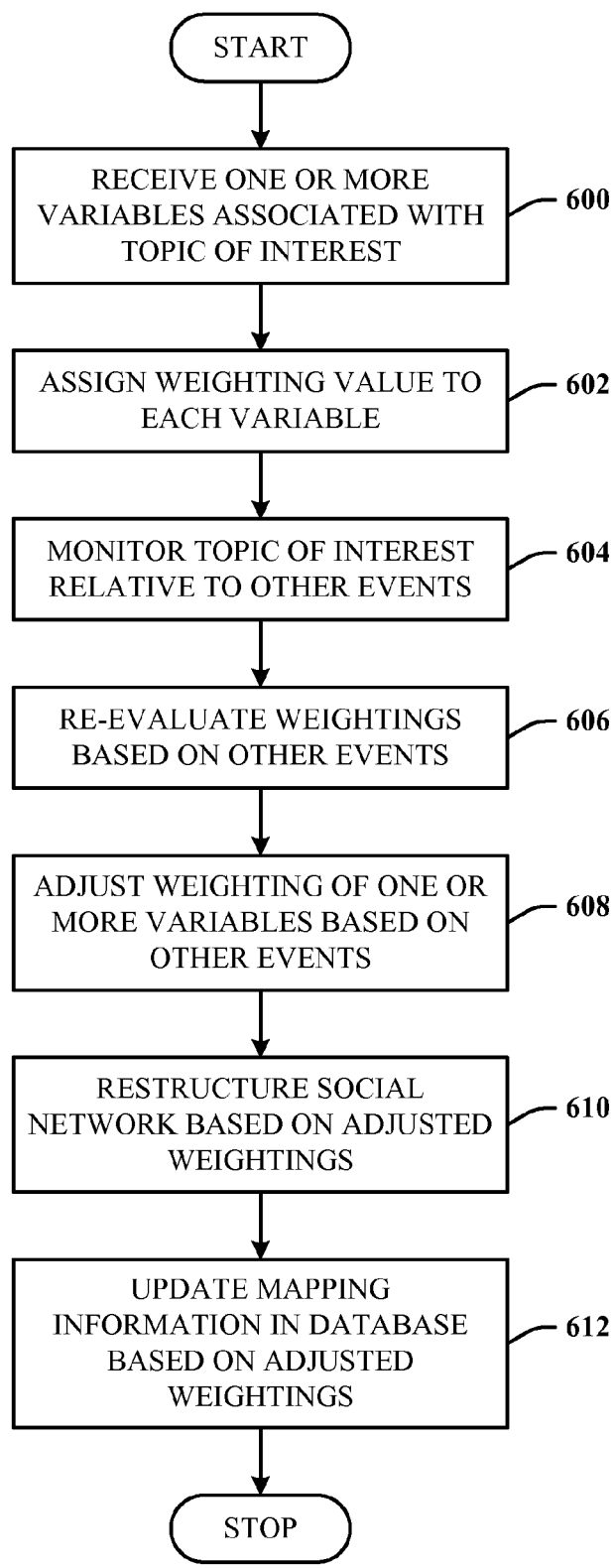
FIG. 6 illustrates a methodology of managing importance or weighting of data in accordance with the disclosed innovation.

FIG. 6 illustrates a methodology of managing importance or weighting of data in accordance with the disclosed innovation. At 600, one or more variables associated with a topic of interest are received. At 602, a weighting value is assigned to each of the variables. At 604, the topic of interest relative to other events is monitored. At 606, the weightings are reevaluated based on the other events. At 608, the weightings of one or more of the variables are readjusted based on the other events. At 610, the social networks are restructured based on the adjusted weightings. At 612, the mapping information in the database is updated based on the adjusted weightings.

In the context of searching and social networks, the sharing of information related a common topic can be what drives the network. Accordingly, search results of a user of the network can be beneficial to other network individuals. Thus, search results by one network user can be posted for access by other network users. In other words, the system can automatically develop or employ a generalized workspace for aggregating web pages or other search results for access by other members or nodes of the social network. This can be employed in a client/server environment and/or a peer-to-peer (P2P) environment.

Figure 7:
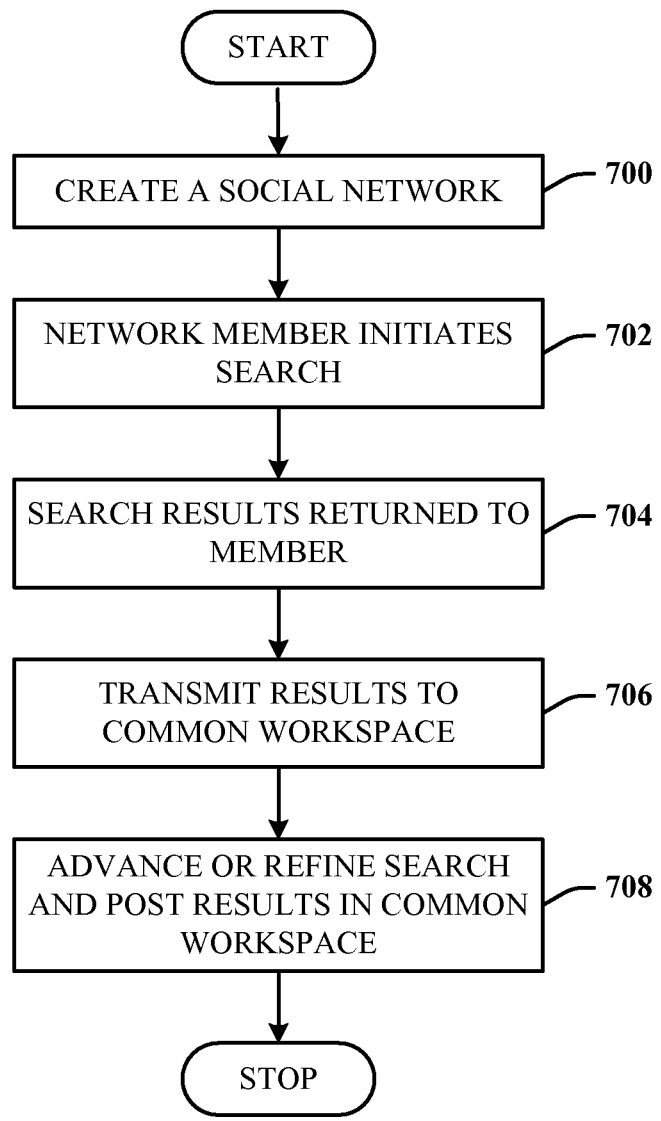
FIG. 7 illustrates a flow diagram of a methodology of sharing search results or other information of a social network.

FIG. 7 illustrates a flow diagram of a methodology of sharing search results or other information of a social network. At 700, a social network is created. At 702, a member of the network initiates a search for information. At 704, the search results are returned to the network member. At 706, the search results are transmitted to a workspace that is accessible by other members of the social network such that these other members can benefit from the search, and further, even advance (or refine) the search using different terms known to them that may not be known to other network nodes the results of which will be returned and presented in the common workspace, as indicated at 708.

In one implementation, sharing of the results can occur automatically for the social network. That is, one of the network user systems can be selected to allow access to other network members to the search results. For example, this can be the computer of the user who initiated the search. In another implementation, the user performing the search can be provided with a selection for manually forwarding or presenting the search results to one or more other members of the network.

In one alternative implementation, the local user storage system can be indexed and scanned for information that uniquely identifies the user. A personalization process can be performed that generates a user profile for that system. In an alternative, yet more expansive approach, select files from each of the network users can be indexed for personalization on a network-wide basis of the social network. Indexed information can include many different types of data such as text, images, video files, audio files, metadata, and context information (e.g., geolocation data such as obtained from global positioning system). Accordingly, the user can be associated with multiple sets of personalization information. This personalization information can provide the basis for linking the user or user social network to other users or networks that share or want to obtain similar information.

Such personalization information can be associated with an e-mail account, for example, thereby facilitating communications of the information, as desired, automatically as a background function and/or manually to selected destinations. In one implementation, this can be facilitated via web access messaging software, such as associated with an e-mail software application.

Figure 8:
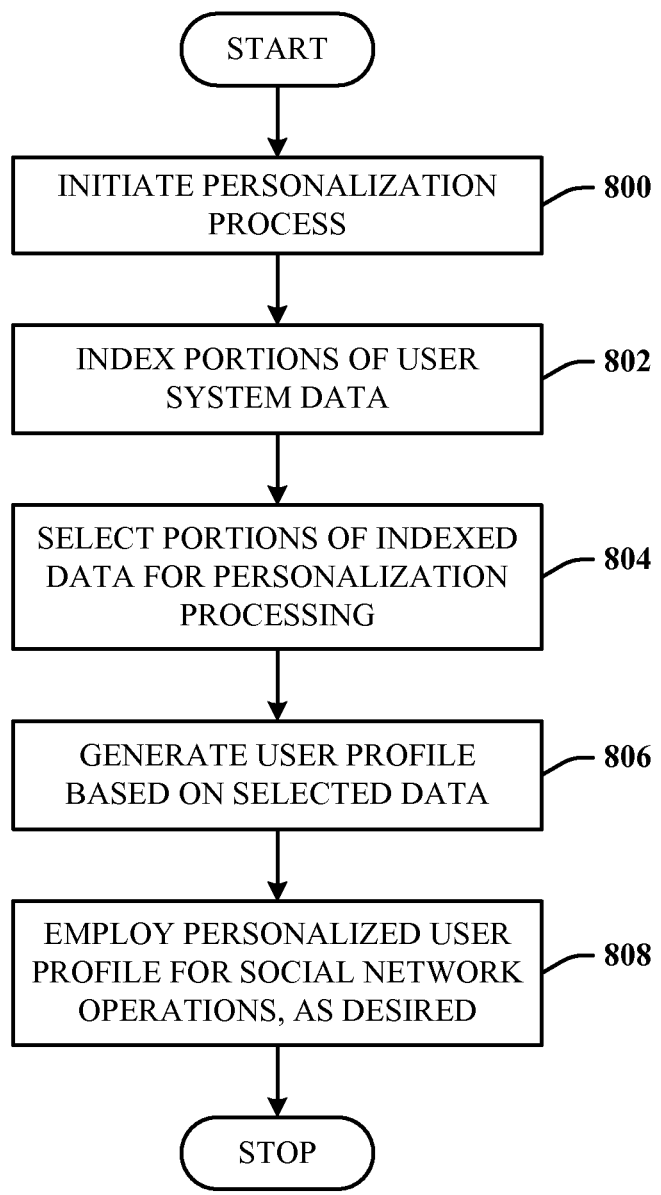
FIG. 8 illustrates a methodology of developing and utilizing personalization information in accordance with an innovative aspect.

FIG. 8 illustrates a methodology of developing and utilizing personalization information in accordance with an innovative aspect. At 800, a personalization process is initiated. At 802, the user system data is indexed. This can include indexing select portions or all of the user system data. At 804, a subset of indexed data is selected for personalization. The selection process can be based on application data type (e.g., word processing document, spreadsheet document, image document, . . . ) and content type (e.g., project information, search text, . . . ), for example. At 806, a user profile is generated based on the selected data. At 808, the profile information is employed for searching and other social network processes as desired.

Figure 9:
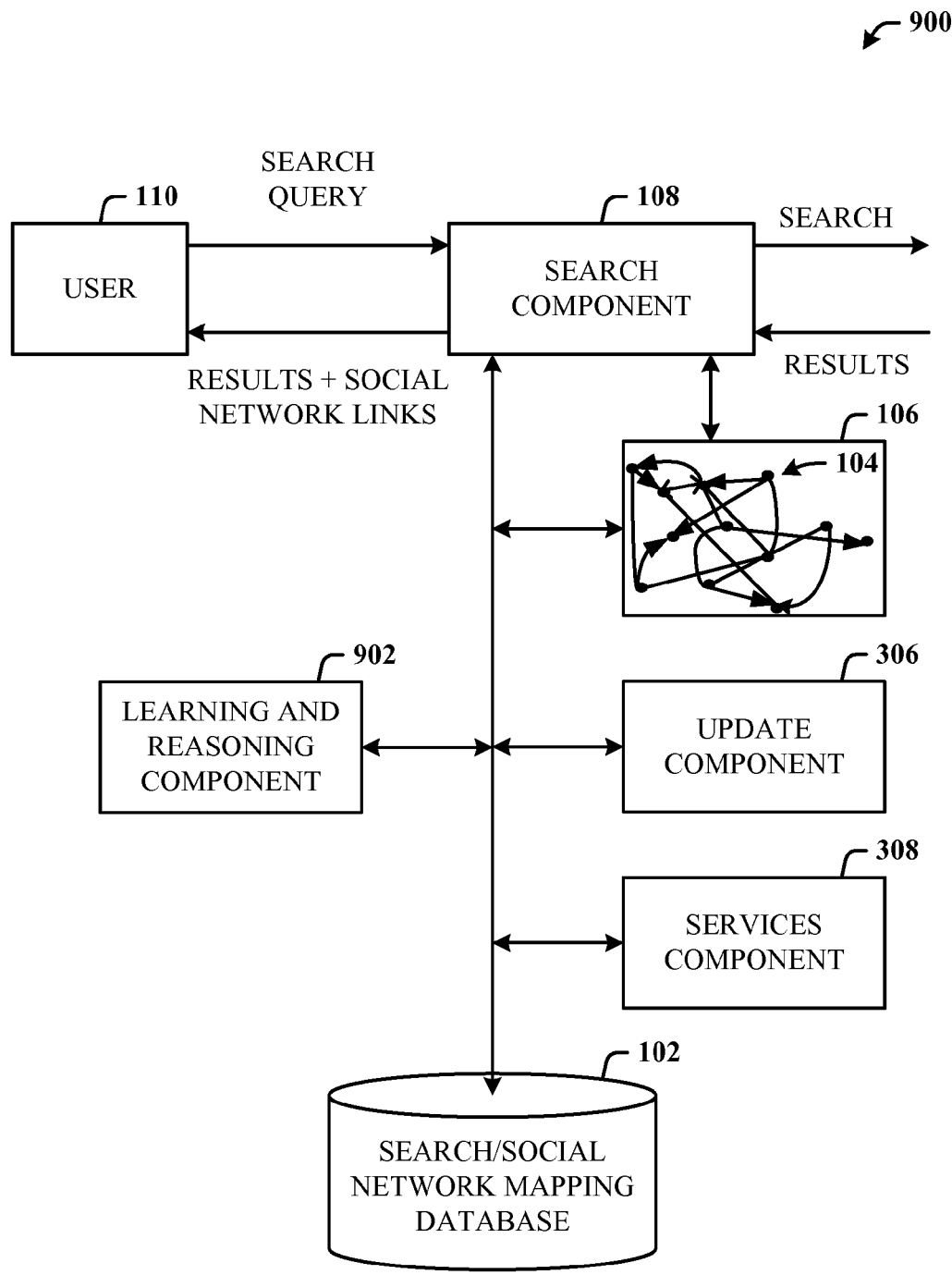
FIG. 9 illustrates an alternative system that employs a machine learning and reasoning component which facilitates automating one or more aspects of the search engine architecture in accordance with the subject innovation.

FIG. 9 illustrates a system 900 that employs a machine learning and reasoning (MLR) component 902 which facilitates automating one or more aspects of the search engine architecture. The innovation (e.g., in connection with selection) can employ various MLR-based schemes for carrying out various aspects thereof. For example, a process for determining what links to return with search results can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or other statistical analysis (e.g., one factoring into the analysis utilities and costs to maximize the expected value to one or more people) to prognose or infer an action that a user desires to be automatically performed.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of ranking or priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

In another implementation, social networking and searching associated therewith, as described herein, can be employed as a means for wikifying one or more aspects. As is commonly known, a wiki is software that allows users to freely create and edit web page content using any web browser. Wiki supports hyperlinks and includes simple text syntax for creating new pages and cross-links between internal pages dynamically. However, the wiki capability can also be applied to social networks and the returning of links to network nodes in search results and the sharing of information. For example, a wikified address book can be provided for access, as well as a calendar and other groups. Wiki editors can be provided in the form of word processors, for example, further providing the capability to track changes, and so on.

The disclosed architecture can facilitate scrapbook functionality by allowing a network user to aggregate or accumulate information for access by other network individuals. The scrapbook can also be sent to others in the network that do not have access thereto. Users can also annotate pages of the scrapbook associated with links or search results. Pages can also be hosted for users of the social network once they become a member of the network, for example. Pages can be pushed to other social network members in different formats, such as MHT (an extension for a MIME HTML file format), for example.

The social network can also facilitate the generation of buddy lists. This can find particular application for network members of a certain locale. In one example, lists can be generated according to searches based on local restaurants. Given the linkability of social network according to common topics, users can track and/or seek out other users who may have purchased or seek to purchase a desired product or service. Queries can also be posed in the form of natural language similar to, for example, "What products are preferred for purchase friends in this department?" or "What friends of friends of friends have gone to this restaurant?"

Social buddy lists can also provide mappings to other's buddy lists if, for example, there are other network acquaintances going through similar experiences as one network member. Moreover, information aggregation can be facilitated with implicit pulling of the information. Along with pulling in information from other members related to what a first user may want, the system facilitates pushing information to the other users from the first user based not only on what the first user found, but what the others users may have searched in the past.

In some cases, access can be to explicit social networks. These networks can be used to build predictive models that can further be used to infer the influence of behaviors on the likelihood of social relationships, and vice versa. For example, an instant messaging service that allows users to define sets of "buddies" as communication partners, defines a social graph. Likewise, a graphical model of social relationships can be constructed by analyzing messaging interactions in an e-mail store; such a graphical analysis that considers links among people listed in the "To:", "cc:" and "From:" fields defines a social graph.

Given such derived graphical models, relationships among people can be considered, along with behaviors that capture individual's search and retrieval, communication, and commerce-related activities, and this behavioral data can be used to build predictive models, such as statistical classifiers, that associate graphical relationships with predicted behaviors. Likewise, predictive models can be also used to predict the likelihood of different social relationships when they have not yet been identified, based on the observed behaviors.

Figure 10:
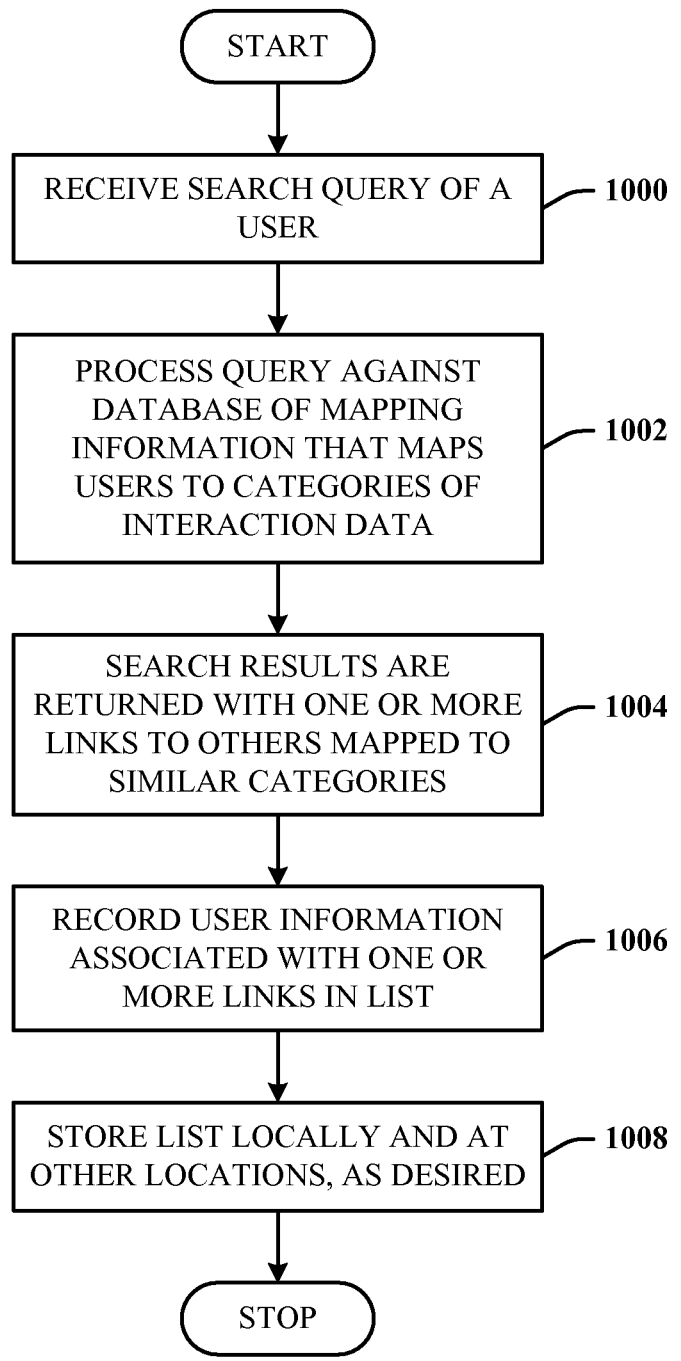
FIG. 10 illustrates a flow diagram of a methodology of generating buddy lists in accordance with a novel aspect.

FIG. 10 illustrates a flow diagram of a methodology of generating buddy lists in accordance with a novel aspect. At 1000, a search query of a user is received for processing. At 1002, the query is processed against a database of mapping information that maps users to categories of interaction data (e.g., searches). At 1004, the search results are returned with one or more links to others who are mapped to similar categories. At 1006, the names (or aliases) of others with similar interests are then added to a buddy list. At 1008, the buddy list can be stored locally, as well as in combination with mappings of users having similar interests.

The disclosed social network search engine architecture also facilitates incentive-based interaction for obtaining information about friends. In one implementation, user interaction can include sensitizing a user to give up information about other users they know. This can be based purely on personal information of another user. In another aspect, this can include providing enticements (e.g., coupons, discounts, rewards, . . . ) to users to provide the information about other users.

Figure 11:
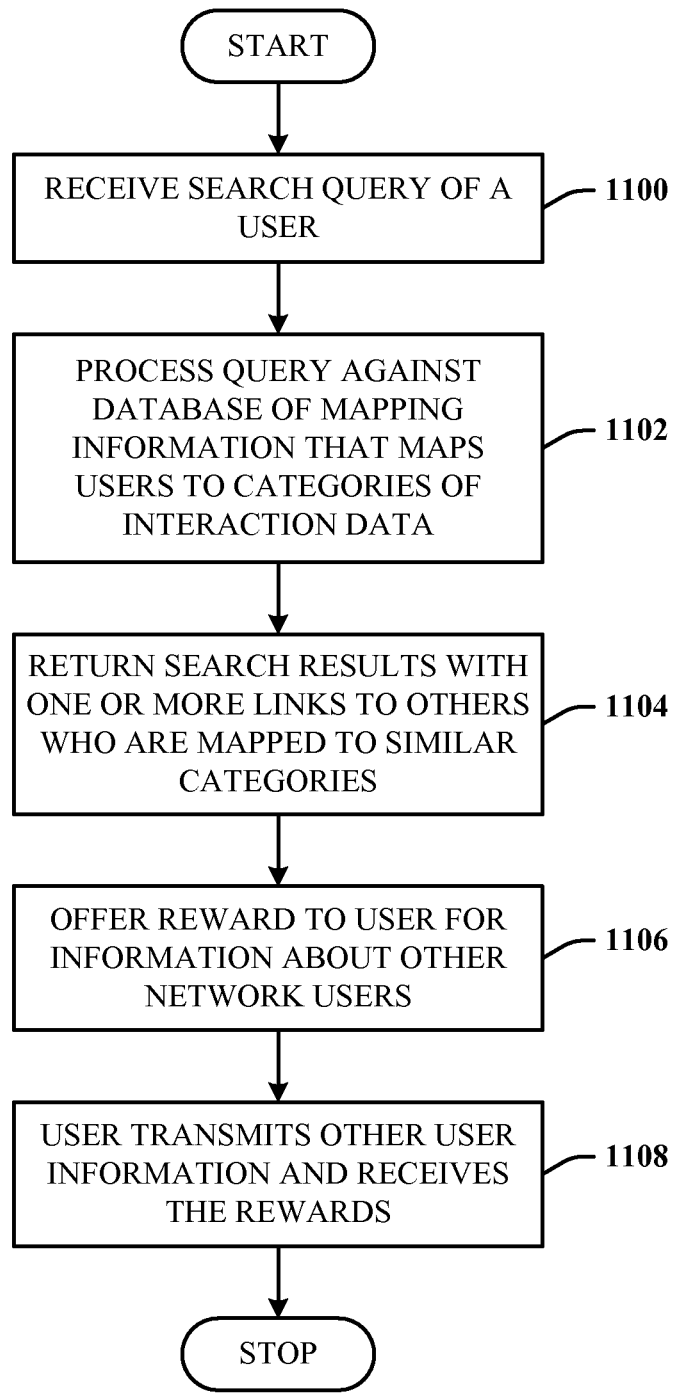
FIG. 11 illustrates a methodology of enticing network users to provide information about other network users.

FIG. 11 illustrates a methodology of enticing network users to provide information about other network users. At 1100, a search query of a first user is received for processing. At 1102, the query is processed against a database of mapping information that maps users to categories of interaction data (e.g., searches). At 1104, the search results are returned with one or more links to other users who are mapped to similar categories. At 1106, one or more rewards are offered to the first user to provide the names or addresses of users associated with the search results. At 1108, the names (or aliases) of others are forwarded to the rewards vendor, and the reward is provided.

Figure 12:
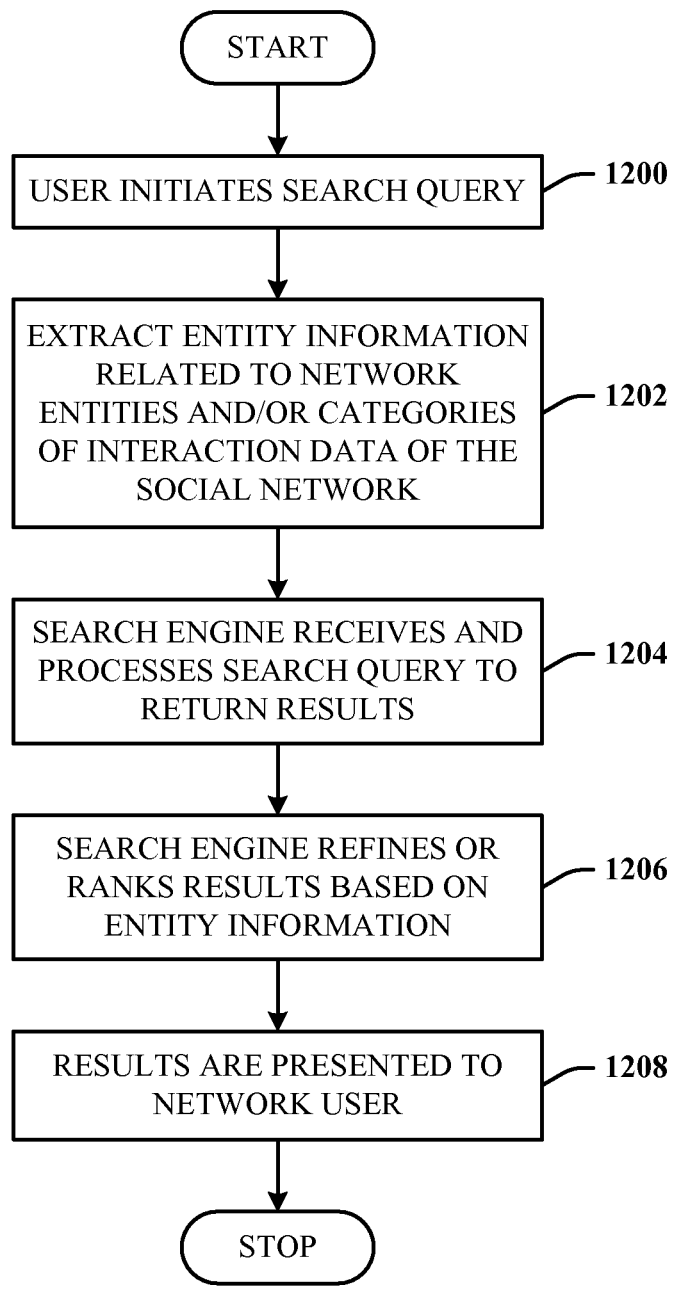
FIG. 12 illustrates a flow diagram representing a methodology of endorsing a search associated with a social network.

FIG. 12 illustrates a flow diagram representing a methodology of endorsing a search associated with a social network. Social networks can be employed to enhance searches via endorsements by other entities (e.g., individual or groups of individuals) of the network. In a local setting, for example, there is a higher probability for multiple interactions. Accordingly, endorsements by more than one network user as to a search query can provide greater weighting to the results for data that is not local to the network. For example, since network users can be grouped according to common or shared topics of interest, the number of users of the network can be utilized as a weighting factor for returning the desired results.

Accordingly, at 1200, a social network user initiates a search. At 1202, the system extracts entity information related to the categories of the interaction data of the network. At 1204, the search engine receives the search query and processes the query to return search results. At 1206, the search engine processes the entity information associated with the user's social network to further refine the search results returned to the user. At 1208, the refined results are presented to the user of the social network.

In connection with advertising, social networks can facilitate a more effective method for targeting users having common interests. Rather than be limited to posting ads on websites known to attract users having certain interests, advertisers can now gain the benefit of users of social networks by "following" the user into the social network. For example, when a network user executes a query, the search engine processes the query and returns not only results but can also return one or more links to other users having similar interests. Thus, the advertiser can cause ads to be executed for presentation to other users of the social network in accordance with the returned links.

In a similar fashion, a social network user can request retrieval of ads that were delivered to fellow users of the social network. In other words, given that advertisers can now offer products and services based on a quantity of responses from users of the social network, a new user of the network can find a benefit in requesting access to the ads to receive the same promotional discounts or rewards, for example.

Figure 13:
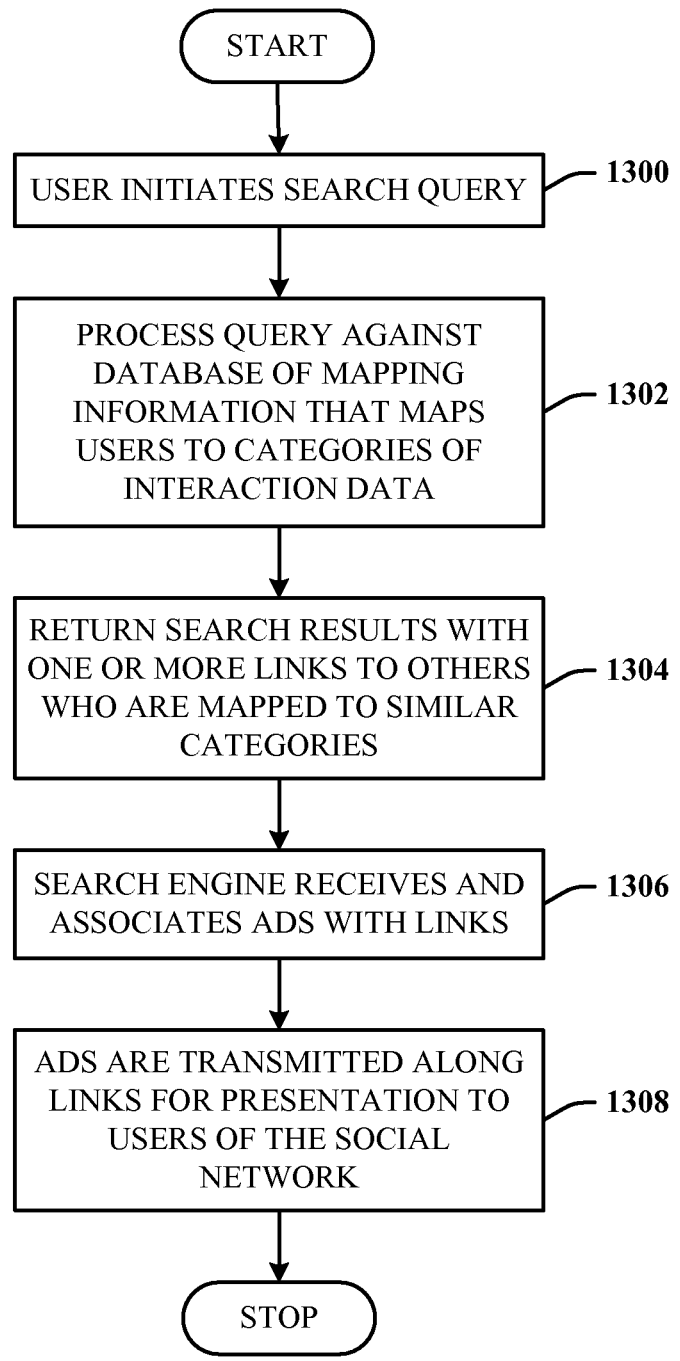
FIG. 13 illustrates a flow diagram of a methodology of processing advertising based on a social network search engine in accordance with another aspect.

FIG. 13 illustrates a flow diagram of a methodology of processing advertising based on a social network search engine in accordance with another aspect. At 1300, a social network user initiates a search. At 1302, the query is processed against a database of mapping information that maps users to categories of interaction data (e.g., searches). At 1304, the search results are returned with one or more links to others who are mapped to similar categories. At 1306, ads are attached to the links. At 1308, the ads are transmitted along the links for presentation to users of the social network.

In accordance with the invention, searching can now be utilized as a discovery mechanism to find social networks. Based on the search, social networks can be found as well as linked groups discovered. Accordingly, favorites can be shared, personal indexes shared, and lists of friends passed on, for example.

In another aspect, not only can users be grouped into social networks in virtual space, but social networks can be grouped by context such as geolocation data, for example. Additionally, blogs can be made more like websites at least with respect to searching and finding the desired results for like topics of interest.

According to another aspect, a speech input version can be deployed that processes voice input separately or in combination with text input, or other input types.

Additionally, topics common to social networks can be searched and distributed and/or federated for publication to network users, or users outside the social network.

The subject social networking search engine architecture also facilitates a snapshooting page mechanism wherein an API can be employed to anticipate a webpage that social network users would want to see. A backend server can retrieve the page, which can include annotation added to the page, as well as stateful information. In a more robust implementation, the internal state of a running program can be provided based on the information anticipated to be searched by the user.

In the context of messaging-centric systems, shared search sensing can be employed. The search engine architecture for social networking can be employed as a client application in cell phones or smartphones where implicit queries can be performed based on what the device user is searching or conversing about.

Figure 14:
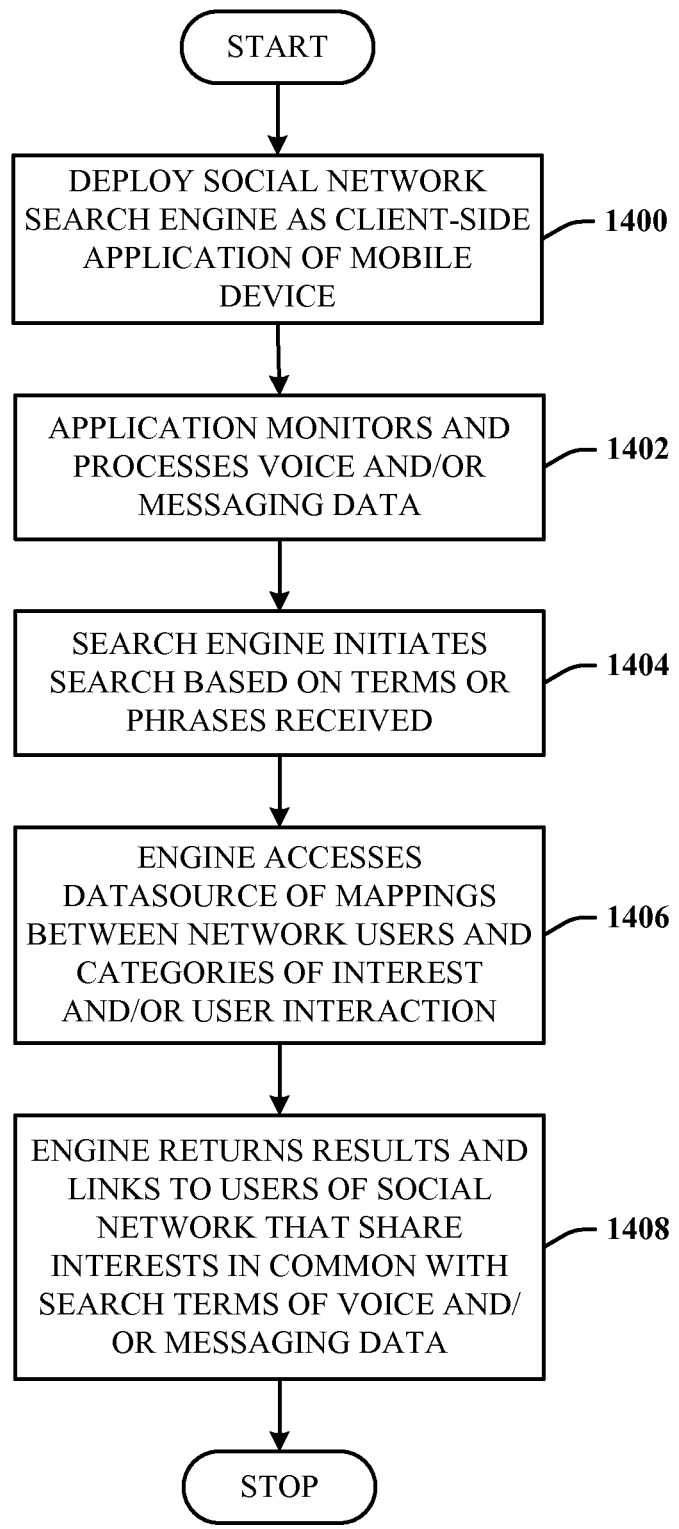
FIG. 14 illustrates a methodology of client-side implementation and processing in accordance with another aspect.

FIG. 14 illustrates a methodology of client side processing in accordance with another aspect. At 1400, the social networking search engine is deployed in a portable mobile device (e.g., a cell phone) as a client-side application. At 1402, the application monitors and processes voice data and/or text message data. At 1404, as a background function, for example, a search can be initiated based on selected terms or phrases received (e.g., voice, text). At 1406, the client-side search engine accesses a datasource (e.g., local or remote) that includes mappings of network users to categories of interest and/or user interaction. At 1408, the engine returns search results as well as links to users of a social network that share interests in common with the topic of conversation or messaging.

Along with a client-side implementation of the social network search engine, a P2P topology can benefit from the search results and links to other users having similar interests in order to reduce server costs. Moreover, search macros can be enabled for customizations. For example, continuing with the cell phone (or mobile device) example implementation, when the user powers the device, a macro or script can be automatically executed (or manually activated) which searches for social networks where users have similar interests.

In another innovative aspect, users can develop a better understanding of social networks. For example, it can be determined how far a network is removed (e.g., one away from me, two away from me, . . . ). Additionally, lists and/or logs can be developed about people who are more likely to know about a certain topic, and what can be learned by looking at their content. Further, an access control interface (ACI) can be applied on content that facilitate content management. Access can be managed for personal and paid-for private feeds.

In another application, bookmarking can be facilitated and an index of reminders provided.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 15:
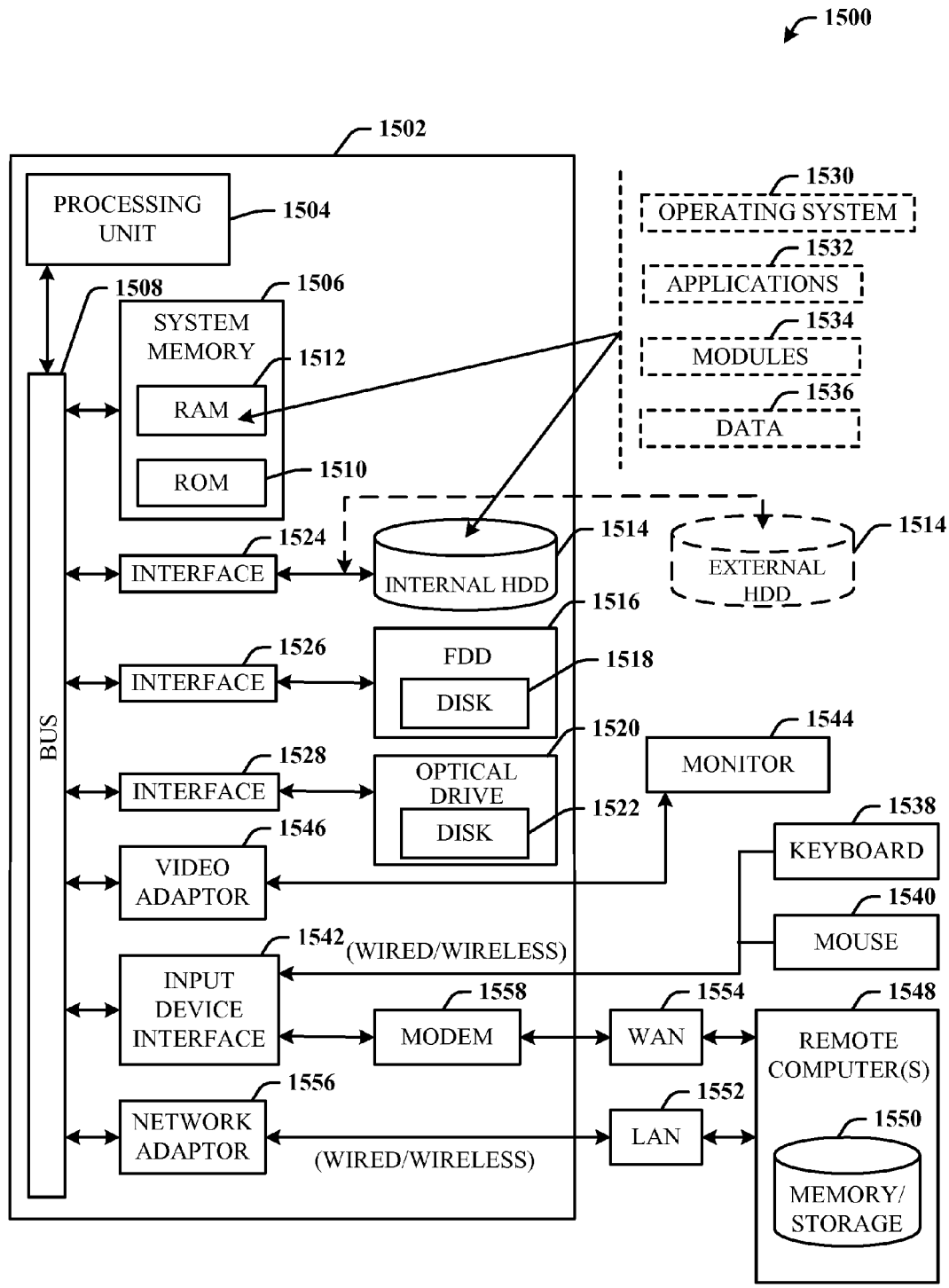
FIG. 15 illustrates a block diagram of a computer operable to execute the disclosed social network search engine architecture.

Referring now to FIG. 15, there is illustrated a block diagram of a computer operable to execute the disclosed social network search engine architecture. In order to provide additional context for various aspects thereof, FIG. 15 and the following discussion are intended to provide a brief, general description of a suitable computing environment 1500 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 15, the exemplary environment 1500 for implementing various aspects includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is to be appreciated that the innovation can be implemented with various commercially available operating systems or combinations of operating systems.

A user can enter commands and information into the computer 1502 through one or more wired/wireless input devices, for example, a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Figure 16:
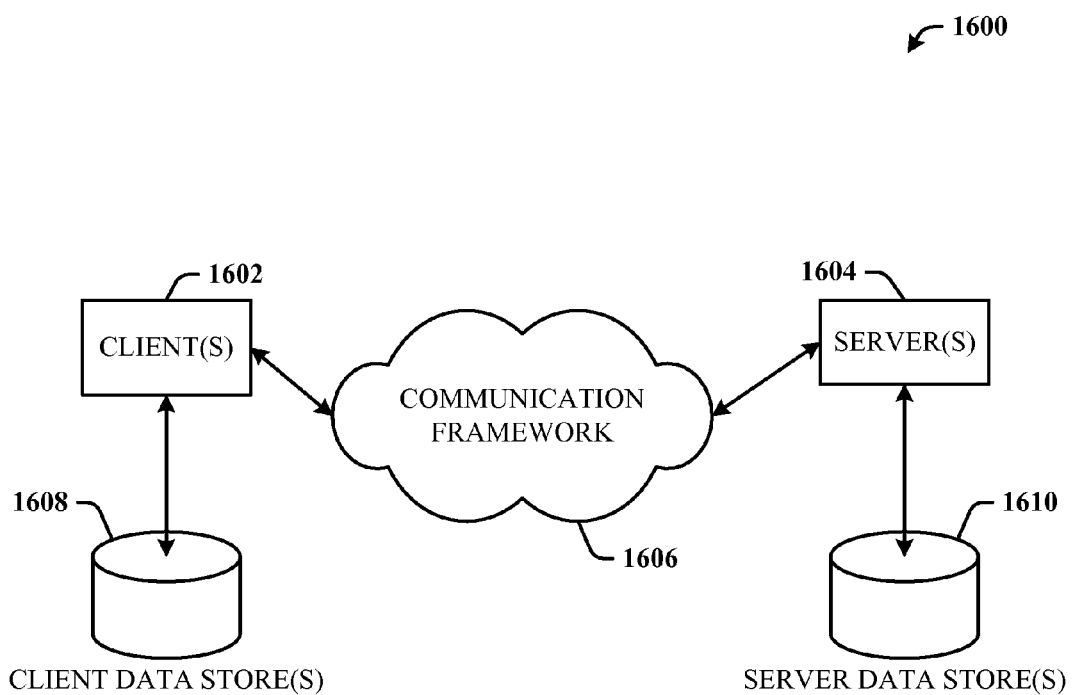
FIG. 16 illustrates a schematic block diagram of an exemplary computing environment for utilizing the social network search engine architecture in accordance with another aspect.

Referring now to FIG. 16, there is illustrated a schematic block diagram of an exemplary computing environment 1600 for utilizing the social network search engine architecture in accordance with another aspect. The system 1600 includes one or more client(s) 1602. The client(s) 1602 can be hardware and/or software (e.g., threads, processes, computing devices). The client(s) 1602 can house cookie(s) and/or associated contextual information by employing the subject innovation, for example.

The system 1600 also includes one or more server(s) 1604. The server(s) 1604 can also be hardware and/or software (e.g., threads, processes, computing devices). The servers 1604 can house threads to perform transformations by employing the invention, for example. One possible communication between a client 1602 and a server 1604 can be in the form of a data packet adapted to be transmitted between two or more computer processes. The data packet may include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
one or more processors;
a database that stores maps of associations between search-related information and entities that are members of a social network; and
memory storing computer-readable instructions by the one or more processors to perform operations including:
performing an analysis of at least one of terms or phrases of searches performed by a plurality of members of the social network to infer interests of the plurality of members;
determining, based on the analysis, that a first number of the searches is associated with a first interest, the first number of the searches being performed by a first group of members included in the social network;
determining, based on the analysis, that a second number of the searches is associated with a second interest, the second number of the searches being performed by a second group of members included in the social network;
forming, in the database, a first subnetwork of the social network, the first subnetwork including the first group of members;
forming, in the database, a second subnetwork of the social network, the second subnetwork including the second group of members;
receiving a search query from a user;
determining search results responsive to the search query;
returning the determined search results;
determining that the search query corresponds with the first interest; and
returning, at least partly in response to determining that the search query corresponds with the first interest, a link to at least one member of the first group of members.

2. The system of claim 1, wherein an entity of the entities of the social network includes an individual or a group of individuals that are members of the social network.

3. The system of claim 1, wherein the operations further include facilitating execution of a background search in connection with interaction between the user and an entity of the entities of the social network.

4. The system of claim 3, wherein the interaction comprises an instant messaging session.

5. The system of claim 1, wherein the operations further include mapping the user to a category of search-related information associated with the search query.

6. The system of claim 1, wherein the operations further include mapping, in the database, an entity of the entities of the social network based at least in part on prior search queries of the entity.

7. The system of claim 1, wherein the operations further include dynamically reorganizing the maps of associations based on a strengthening or a weakening of a correlation between an entity of the entities of the social network and a category of information.

8. The system of claim 1, wherein the computer-readable instructions include one or more components utilized in a collaboration application.

9. The system of claim 1, wherein the search-related information includes one or more topics of interest associated with a work project, the user is a manager of the work project, and the operations further include:
assigning a weighting to an individual topic of interest of the one or more topics of interest, the individual topic of interest being associated with a milestone of the work project and a deadline for satisfying the milestone;
adjusting the weighting of the individual topic of interest as the work project temporally approaches the deadline for satisfying the milestone; and
in response to an additional search query from the manager, returning an additional link to an employee associated with the work project based on the maps, the employee being an entity of the entities of the social network.

10. The system of claim 1, wherein the operations further include facilitating execution of a background search in connection with communications between two or more of the entities, wherein the results of the background search are cached and dynamically displayed to at least one of the entities.

11. The system of claim 1, wherein the operations further include:
analyzing one or more search results or one or more search queries by an entity of the entities of the social network; and
predicting a likelihood that the entity and at least one other entity of the entities of the social network have a social relationship.

12. The system of claim 1, wherein the search-related information comprises one or more categories associated with previously performed searches.

13. The system of claim 1, wherein returning the link to the at least one member of the first group of members of the included in the social network comprises returning a single link associated with multiple members of the first group of members.

14. A computer-implemented method comprising:
performing an analysis of at least one of terms or phrases of searches performed by a plurality of members of a social network to infer interests of the plurality of members;
determining, based on the analysis, that a first number of the searches is associated with a first topic of interest, the first number of the searches being performed by a first group of members included in the social network;
determining, based on the analysis, that a second number of the searches is associated with a second topic of interest, the second number of the searches being performed by a second group of members included in the social network;
receiving a search query from a user;
in response to receiving the search query:
determining, by a computer, search results responsive to the search query;
returning, by the computer, the determined search results;
accessing, by the computer, a database of mapping information, wherein the mapping information maps the first group of members included in the social network with the first topic of interest and the second group of members included in the social network with the second topic of interest;
forming, by the computer and in the database, a first subnetwork of the social network, the first subnetwork including the first group of members included in the social network;
forming, by the computer and in the database, a second subnetwork of the social network, the second subnetwork including the second group of members included in the social network;
determining, by the computer, that the search query matches the first topic of interest; and returning, by the computer and at least partly in response to determining that the search query matches the first topic of interest, a link to at least one member of the first subnetwork of the social network.

15. The method of claim 14, wherein the processing of the search query is executed as a background operation during a communications session between the user and a member of the social network, wherein the search query is based at least in part on phrases used for communication between the user and the member of the social network during the communications session.

16. The method of claim 14, further comprising presenting an advertisement to at least one of the members of the social network based on the search query.

17. The method of claim 14, further comprising personalizing the search query based on indexed files local to a system of the user.

18. The method of claim 14, the social network including a plurality of subnetworks, the method further comprising:
   determining that at least a subset of the members of the social network are interacting in such a way as to satisfy a threshold of interest with respect to an additional topic of interest; and
   in response to the threshold of interest being satisfied, automatically forming a new subnetwork of the social network based on the additional topic of interest.

19. A method comprising:
   under control of one or more processors configured with executable instructions:
   performing an analysis of at least one of terms or phrases of searches performed by a plurality of members of the social network to infer interests of the plurality of members;
   determining, based on the analysis, that a number of the searches is associated with a topic of interest, the number of the searches being performed by a group of members included in the social network;
   storing mapping information in a database, the mapping information indicating that the group of members included in the social network is associated with the topic of interest;
   forming a subnetwork of the social network including the group of the members of the social network;
   receiving a search query from a user of the social network;
   determining search results responsive to the search query;
   returning the search results to the user of the social network;
   determining that the search query matches the topic of interest; and
   returning, to the user of the social network, a link associated with the group of members of the social network at least partly in response to determining that the search query matches the topic of interest.

20. The method of claim 19, further comprising generating a buddy list for the user of the social network that includes one or more other users of the social network that also share the topic of interest.

* * * * *